US012198653B2

(12) United States Patent
Lim

(10) Patent No.: US 12,198,653 B2
(45) Date of Patent: Jan. 14, 2025

(54) DISPLAY DEVICE AND DRIVING METHOD UNIFORMLY DISPLAYING IMAGE BY CHANGING OPERATION ORDER OF MULTIPLEXERS

(71) Applicant: LX SEMICON CO., LTD., Daejeon (KR)

(72) Inventor: Hun Yong Lim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/545,530

(22) Filed: Dec. 8, 2021

(65) Prior Publication Data

US 2022/0189431 A1 Jun. 16, 2022

(30) Foreign Application Priority Data

Dec. 11, 2020 (KR) ........................ 10-2020-0172946

(51) Int. Cl.
*G09G 3/36* (2006.01)

(52) U.S. Cl.
CPC ......... *G09G 3/3688* (2013.01); *G09G 3/3677* (2013.01); *G09G 2300/0452* (2013.01); *G09G 2310/0297* (2013.01)

(58) Field of Classification Search
CPC ...... G09G 3/36; G09G 3/3611; G09G 3/3614; G09G 3/3648; G09G 3/3674;
(Continued)

(56) References Cited

U.S. PATENT DOCUMENTS 7,667,675 B2 * 2/2010 Kyeong ............... G09G 3/3688 345/98
2008/0170027 A1 * 7/2008 Kyeong ............... G09G 3/3688 345/100

(Continued)

FOREIGN PATENT DOCUMENTS

KR 10-2013-0037490 A 4/2013
KR 20150078820 A 7/2015
KR 10-2016-0033289 A 3/2016

OTHER PUBLICATIONS

Request for the Submission of an Opinion for Korean Patent Application No. 10-2020-0172946, mailed Sep. 3, 2024; 18 pages.

*Primary Examiner* — Ke Xiao
*Assistant Examiner* — Nelson Lam
(74) *Attorney, Agent, or Firm* — Greenberg Traurig, LLP

(57) ABSTRACT

A display device according to one embodiment includes a data drive unit that converts image data into a data signal and outputs the data signal, a multiplexer unit that time-divides the data signal output from the data drive unit and outputs the time-divided data signals, and a gate drive unit that outputs a gate signal synchronized with the data signal to a first gate line, a second gate line, a third gate line, and a fourth gate line, wherein the multiplexer unit includes a first multiplexer and a second multiplexer, when the gate signal is sequentially input to the first gate line and the second gate line, the first multiplexer and the second multiplexer are sequentially turned on, and when the gate signal is sequentially input to the third gate line and the fourth gate line, the second multiplexer and the first multiplexer are sequentially turned on.

13 Claims, 12 Drawing Sheets

(58) Field of Classification Search
CPC .. G09G 3/3677; G09G 3/3681; G09G 3/3685; G09G 3/3688; G09G 3/3692; G09G 2310/0297
USPC .................................................... 345/87–104
See application file for complete search history.

(56) References Cited

U.S. PATENT DOCUMENTS

| | | | | |
|---|---|---|---|---|
| 2008/0252588 | A1* | 10/2008 | Huang ..................... | G09G 3/20 345/100 |
| 2009/0146939 | A1* | 6/2009 | Hirayama ............ | G09G 3/3677 345/98 |
| 2015/0187293 | A1* | 7/2015 | Yoo ...................... | G09G 3/3614 345/694 |
| 2016/0078826 | A1* | 3/2016 | Yoo ...................... | G09G 3/3688 345/88 |
| 2016/0322008 | A1* | 11/2016 | Sang .................... | G09G 3/3607 |
| 2018/0151145 | A1* | 5/2018 | Lee .......................... | G09G 5/02 |
| 2020/0051493 | A1 | 2/2020 | Park et al. | |
| 2020/0184895 | A1* | 6/2020 | Zhao .................... | G09G 3/2074 |

* cited by examiner

DISPLAY DEVICE AND DRIVING METHOD UNIFORMLY DISPLAYING IMAGE BY CHANGING OPERATION ORDER OF MULTIPLEXERS

CROSS-REFERENCE TO RELATED APPLICATIONS

This application claims the benefit of the Korean Patent Applications No. 10-2020-0172946 filed on Dec. 11, 2020, which are hereby incorporated by reference as if fully set forth herein.

FIELD OF THE INVENTION

The present disclosure relates to a display device and a method of driving the same.

BACKGROUND

Liquid crystal displays (LCDs) using liquid crystals and organic light emitting diode (OLED) displays using OLEDs are representative as display devices for displaying an image.

In particular, an LCD device displays an image by controlling an electric field applied to liquid crystal molecules according to a data signal. In an active matrix drive type LCD device, a thin film transistor (hereinafter, referred to as a "TFT") is formed in each pixel.

The LCD device includes an LCD panel, a backlight unit that irradiates the LCD panel with light, a source drive integrated circuit (hereinafter, referred to as an "IC") for supplying a data voltage to data lines of the LCD panel, a gate drive IC for supplying a gate pulse (or scan pulse) to gate lines (or scan lines) of the LCD panel, a control circuit that controls the gate drive ICs, a light source drive circuit for driving a light source of the backlight unit, and the like.

Further, a multiplexer unit MUX is installed between the source drive IC and the data lines of the display panel, and thus the cost of the display device may be reduced. The multiplexer may time-divide a data signal output from the source drive IC and distribute the time-divided data signal to the data lines, thereby reducing the number of output channels of the source drive IC. In this case, a display defect may occur depending on a data signal output order of multiplexers.

SUMMARY

The present disclosure is directed to providing a display device for preventing display defects and a method of driving the same.

A display device according to one embodiment of the present disclosure includes a data drive unit that converts image data into a data signal and outputs the data signal, a multiplexer unit that time-divides the data signal output from the data drive unit and outputs the time-divided data signals, and a gate drive unit that outputs a gate signal synchronized with the data signal to a first gate line, a second gate line, a third gate line, and a fourth gate line, wherein the multiplexer unit includes a first multiplexer and a second multiplexer, when the gate signal is sequentially input to the first gate line and the second gate line, the first multiplexer and the second multiplexer are sequentially turned on, and when the gate signal is sequentially input to the third gate line and the fourth gate line, the second multiplexer and the first multiplexer are sequentially turned on.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
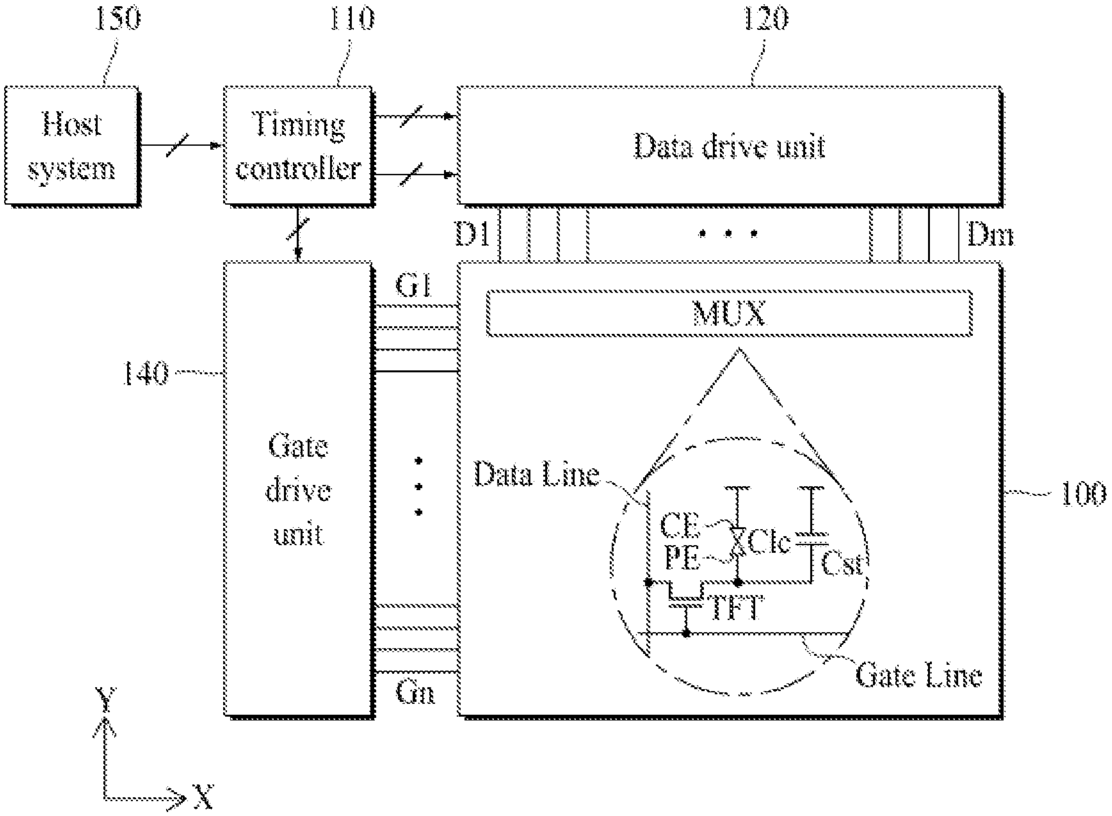
FIG. 1 is a block diagram illustrating a display device according to one embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display device according to the present disclosure will be described in detail with reference to FIG. 1.

FIG. 1 is a block diagram illustrating a display device according to one embodiment of the present disclosure.

Referring to FIG. 1, the display device according to one embodiment of the present disclosure may include a display panel 100, a timing controller 110, a data drive unit 120, a multiplexer unit MUX, a gate drive unit 140, and a host system 150.

The display panel 100 may be implemented as a flat panel display such as a liquid crystal display (LCD) or an organic light emitting diode (OLED) display.

The display panel 100 includes a plurality of gate lines G1 to Gn, a plurality of data lines D1 to Dm, and a plurality of pixels (not illustrated) to display an image having a predetermined gradation.

Each of the plurality of gate lines G1 to Gn receives a scan pulse during a display period DP. Each of the plurality of data lines D1 to Dm receives a data signal during the display period DP. The plurality of gate lines G1 to Gn and the plurality of data lines D1 to Dm are located on a substrate to intersect each other so as to define the plurality of pixels. Each of the plurality of pixels may include a thin film transistor (TFT) connected to an adjacent gate line and an adjacent data line, a pixel electrode PE and a common electrode CE connected to the TFT, a liquid crystal capacitor Clc between the pixel electrode PE and the common electrode CE, and a storage capacitor Cst connected to the pixel electrode PE.

The timing controller 110 receives, from an external system (not illustrated), various timing signals including a vertical sync signal Vsync, a horizontal sync signal Hsync, a data enable signal DE, a clock signal CKL, and the like and generates a gate control signal GCS for controlling the gate drive unit 140 and a data control signal DCS for controlling the data drive unit 120. Further, the timing controller 110 receives image data from the external system, converts the received image data into image data in a form that may be processed by the data drive unit 120, and outputs the converted image data.

The data drive unit 120 receives the data control signal DCS and the image data RGB' from the timing controller 110 during the display period DP. The data control signal DCS may include a source start pulse SSP, a source sampling clock SSC, a source output enable signal SOE, and the like. The source start pulse SSP controls sampling start timings of n source drive ICs (not illustrated) constituting the data drive unit 120. The source sampling clock SSC is a clock signal that controls a sampling timing of data in each source drive IC. The source output enable signal SOE controls an output timing of each source drive IC.

Further, the data drive unit 120 converts the received image data into an analog data signal and supplies the converted analog data signal to the pixels through the plurality of data lines D1 to Dm.

The multiplexer unit MUX may time-divide the data signal and distribute the time-divided data signal to the data lines, thereby reducing the number of source drive ICs required for driving the display panel 100. Further, the multiplexer unit MUX may be disposed at an end of the data lines D1 to Dm through which the signal output from the data drive unit 120 is received in the display panel 100. That is, the multiplexer unit MUX may receive the data signal output from the data drive unit 120 and output the received data signal to the data lines D1 to Dm. The multiplexer unit MUX will be described below in detail with reference to FIGS. 2 to 4.

The gate drive unit 140 receives a gate control signal GCS from the timing controller 110. The gate control signal GCS may include a gate start pulse GSP, a gate shift clock GSC, a gate output enable signal, and the like. The gate drive unit 140 generates a gate pulse (or a scan pulse) synchronized with the data signal through the received gate control signal GCS and shifts the generated gate pulse to sequentially supply the shifted gate pulse to the gate lines G1 to Gn. To this end, the gate drive unit 140 may include a plurality of gate drive ICs (not illustrated). The gate drive ICs sequentially supply a gate pulse synchronized with the data signal to the gate lines G1 to Gn under a control of the timing controller 110 during the display period DP and selects the data line in which the data signal is written. The gate pulse swings between a gate high voltage and a gate low voltage.

The host system 150 converts digital image data into a format suitable for displaying on the display panel 100. The host system transmits the timing signals together with the digital image data to the timing controller 110. The host system is implemented as any one of a television system, a set-top box, a navigation system, a digital versatile disc player, a Blu-ray player, a personal computer (PC), a home theater system, and a phone system to receive an input image.

Hereinafter, a data drive unit and a multiplexer unit according to one embodiment of the present disclosure will be described in detail with reference to FIG. 2.

Figure 2:
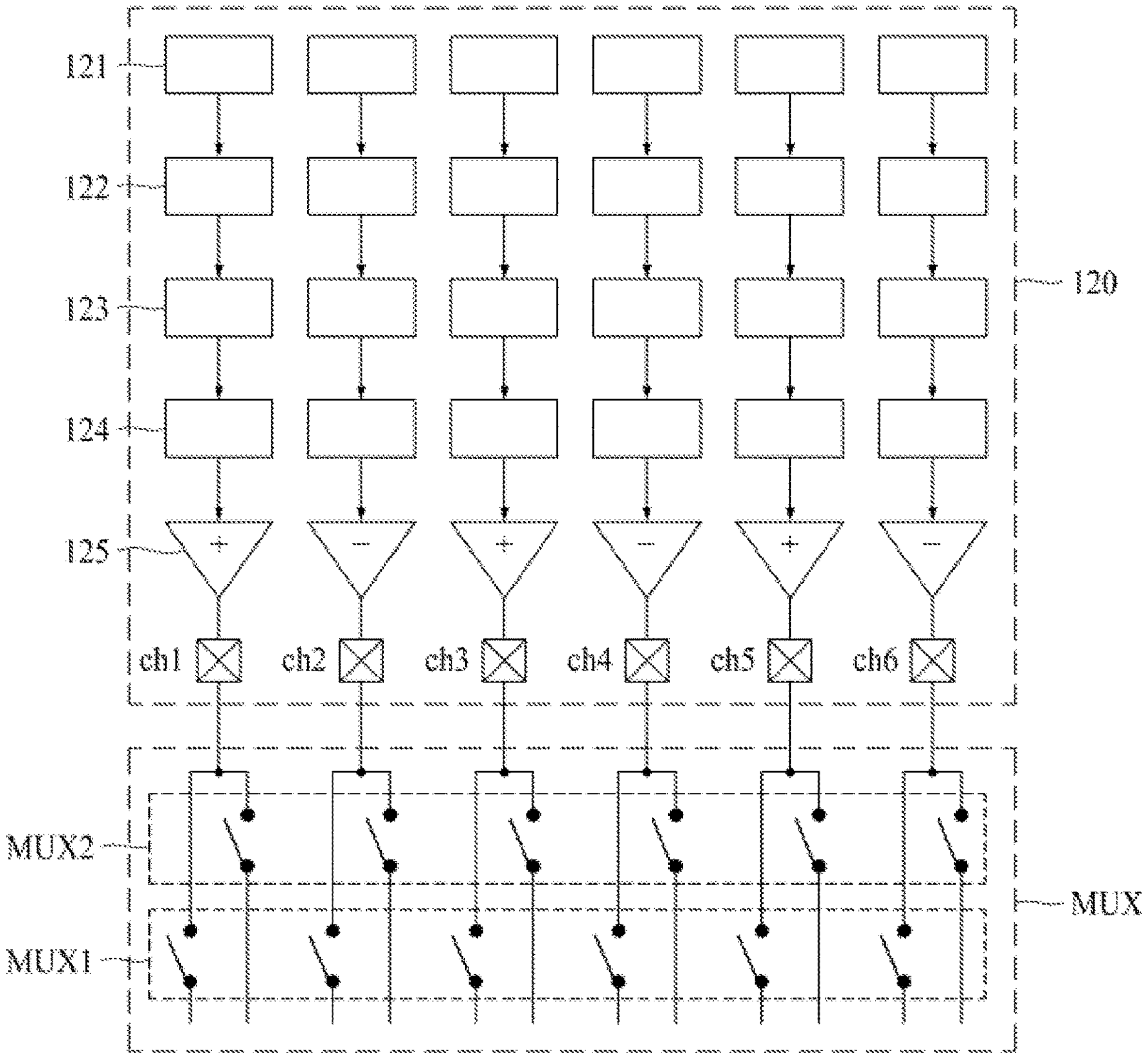
FIG. 2 is a view illustrating a data drive unit according to one embodiment of the present disclosure.

FIG. 2 is a view illustrating a data drive unit according to one embodiment of the present disclosure.

Referring to FIG. 2, the data drive unit 120 includes a shift register circuit 121, a latch circuit 122, a level shifter circuit 123, a digital-analog converter circuit 124, a multiplexer unit MUX, and an output buffer circuit 125.

The shift register circuit 121 receives the source start pulse SSP and the source sampling clock SSC from the timing controller 110, sequentially shifts the source start pulse SSP according to the source sampling clock SSC, and outputs sampling data. The shift register circuit 121 transmits the sampling data to the latch circuit 122.

The latch circuit 122 sequentially samples and latches the image data into predetermined units according to the sampling data. The latch circuit 122 transmits the latched image data to the level shifter circuit 123.

The level shifter circuit 123 amplifies the level of the latched image data. In detail, the level shifter circuit 123 amplifies the level of the image data to a level in which the digital-analog converter circuit 124 may be driven. The level shifter circuit 123 transmits the level-amplified image data to the digital-analog converter circuit 124.

The digital-analog converter circuit 124 converts the image data into the data signal that is an analog signal. The digital-analog converter circuit 124 transmits the data signal converted into the analog signal to the output buffer circuit 125.

The output buffer circuit 125 outputs a source signal to the data lines. In detail, the output buffer circuit 125 buffers and outputs the source signal according to the source output enable signal SOE generated by the timing controller 110.

The output buffer circuit 125, which is a buffer amplifier, supplies a positive (+) data signal or a negative (−) data signal to source channels ch1-ch6. For example, the output buffer circuit 125 may supply the positive (+) data signal to first, third, and fifth source channels ch1, ch3, and ch5, and the output buffer circuit 125 may supply the negative (−) data signal to second, fourth, and sixth source channels ch2, ch4, and ch6.

The multiplexer unit MUX time-divides and supplies the data signal input from the digital-analog converter circuit 124 to the data lines D1 to Dm according to the signal output from the timing controller 110. A 2:1 multiplexer time-divides the data signal input through one output line of the digital-analog converter circuit 124 by the timing controller 110 and supplies the time-divided data signal to two output buffer circuits 125. Thus, when the 2:1 multiplexer is used, the number of shift register circuits 121, the number of latch circuits 122, the number of level shifter circuits 123, the number of digital-analog converter circuit 124, and the number of output buffer circuits 125 may be reduced by half, and thus the area of the source drive IC can be reduced by half.

According to one embodiment of the present disclosure, the multiplexer unit MUX includes a first multiplexer MUX1 and a second multiplexer MUX2.

Hereinafter, the multiplexer unit and the pixel array according to one embodiment of the present disclosure will be described in detail with reference to FIGS. 3 to 5H.

Figure 3:
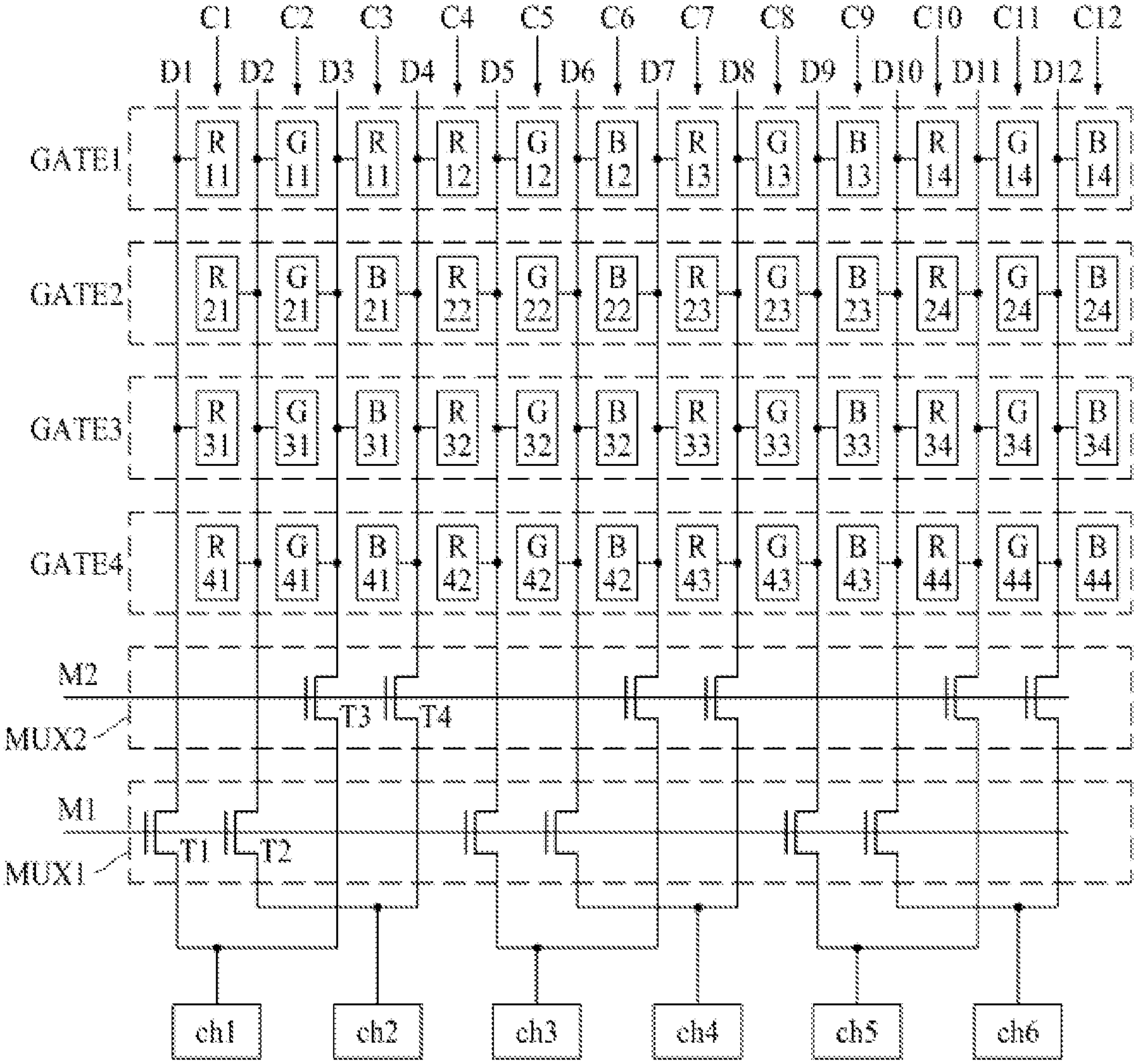
FIG. 3 is a view illustrating a multiplexer unit and a pixel array according to one embodiment of the present disclosure.
Figure 4:
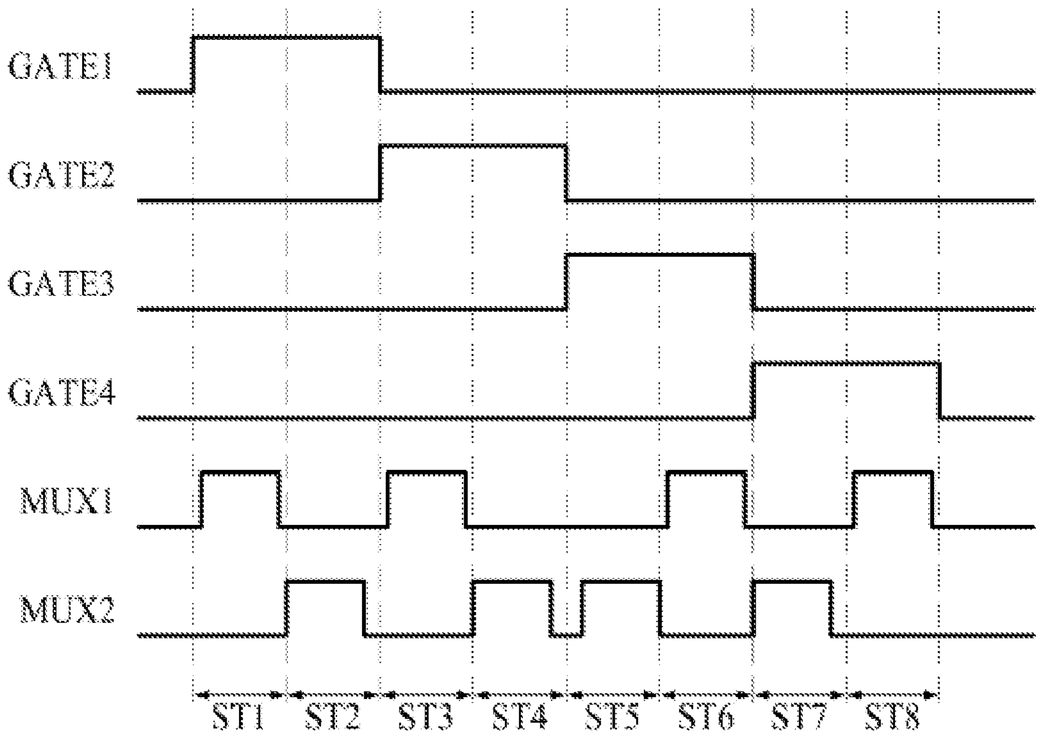
FIG. 4 is a view illustrating a gate signal and a signal waveform output from a multiplexer according to one embodiment of the present disclosure.

FIG. 3 is a view illustrating a multiplexer unit and a pixel array according to one embodiment of the present disclosure. FIG. 4 is a view illustrating a gate signal and a signal waveform output from a multiplexer according to one embodiment of the present disclosure. FIGS. 5A to 5H are views illustrating respective drive operations of the multiplexer unit and the pixel array according to one embodiment of the present disclosure.

According to one embodiment of the present disclosure, the multiplexer unit MUX includes first to fourth switches T1 to T4. First and second multiplexer control signals M1 and M2 may be supplied to gates of the first to fourth switches T1 to T4. The switches T1 to T4 are connected to the source channels ch1-ch6 and the data lines D1 to Dm of the data drive unit 120.

The multiplexer unit MUX time-divides a data voltage output from the source drive IC according to the first and second multiplexer control signals M1 and M2 provided from the timing controller 110 and distributes the time-divided data voltage to the data lines D1 to Dm. The first and second multiplexer control signals M1 and M2 are generated in opposite phases. The second multiplexer control signal M2 may be generated by inverting the first multiplexer control signal M1 using an inverter. A switching period of the first and second multiplexer control signals M1 and M2 is one horizontal period. The one horizontal period is a time required to input data to pixels arranged in one horizontal line of the pixel. Accordingly, the first and second multiplexers MUX1 and MUX2 have the switching period of one horizontal period, are turned on during half of the horizontal period, and are turned off during half of the horizontal period.

According to one embodiment of the present disclosure, the source channels ch1-ch6 are connected to data lines D1-D12 through the first and second multiplexers MUX1 and MUX2. As illustrated in FIG. 3, the first source channel ch1 is connected to the first and third data lines D1 and D3 through the first and second multiplexers MUX1 and MUX2, and the second source channel ch2 is connected to the second and fourth data lines D2 and D4 through the first and second multiplexers MUX1 and MUX2.

In detail, a $(4n-3)^{th}$ data line (n is a natural number) may receive a data signal output from a $(2n-1)^{th}$ source channel (n is a natural number) through the first multiplexer MUX1, and a $(4n-2)^{th}$ data line (n is a natural number) may receive a data signal output from a $2n^{th}$ source channel (n is a natural number) through the first multiplexer MUX1. Further, a $(4n-1)^{th}$ data line (n is a natural number) may receive the data signal output from the $(2n-1)^{th}$ source channel (n is a natural number) through the second multiplexer MUX2, and a $(4n)^{th}$ data line (n is a natural number) may receive the data signal output from the $2n^{th}$ source channel (n is a natural number) through the second multiplexer MUX2.

The first switch T1 is connected between the first source channel ch1 and the first data line D1 and supplies, to the first data line D1, a positive data voltage output through the first source channel ch1 in response to the first multiplexer control signal M1. The second switch T2 is connected between the second source channel ch2 and the second data line D2 and supplies, to the second data line D2, a negative data voltage output through the second source channel ch2 in response to the first multiplexer control signal M1. Although not illustrated, the first and second switches T1 and T2 may be alternately turned on.

The third switch T3 is connected between the first source channel ch1 and the third data line D3 and supplies, to the third data line D3, a positive data voltage output through the first source channel ch1 in response to the second multiplexer control signal M2. The fourth switch T4 is connected between the second source channel ch2 and the fourth data line D4 and supplies, to the fourth data line D4, a negative data voltage output through the second source channel ch2 in response to the second multiplexer control signal M2. Although not illustrated, the third and fourth switches T3 and T4 may be alternately turned on.

First to third vertical lines C1 to C3 respectively extending along the first to third data lines D1 to D3 may be defined. A first color pixel, a second color pixel, and a third color pixel are arranged on the first vertical line C1 to the third vertical line C3, respectively. In this case, the first color may be red (R), the second color may be green (G), and the third color may be blue (B).

Pixels of odd-numbered horizontal lines GATE1 and GATE3 and pixels of even-numbered horizontal lines GATE2 and GATE4 may be connected in a zigzag manner in a direction in which the pixels are connected to the data lines. For example, the pixels arranged on the odd-numbered horizontal lines GATE1 and GATE3 are connected to the data lines arranged on the left side of the corresponding pixels, and the pixels arranged on the even-numbered horizontal lines GATE2 and GATE4 are connected to the data lines arranged on the right side of the corresponding pixels.

Referring to FIGS. 3 to 5H, the multiplexer unit and the pixels according to one embodiment of the present disclosure may be driven to display an image according to first to eighth drive operations ST1-ST8.

According to one embodiment of the present disclosure, the pixels may be driven according to the gate signals and the first and second multiplexer control signals illustrated in FIG. 4.

According to one embodiment of the present disclosure, as illustrated in FIG. 4, in the first to fourth drive operations ST1-ST4, when the gate signal is input to the first horizontal line GATE1 and the second horizontal line GATE2, the first multiplexer MUX1 and the second multiplexer MUX2 are sequentially turned on.

Figure 5A:
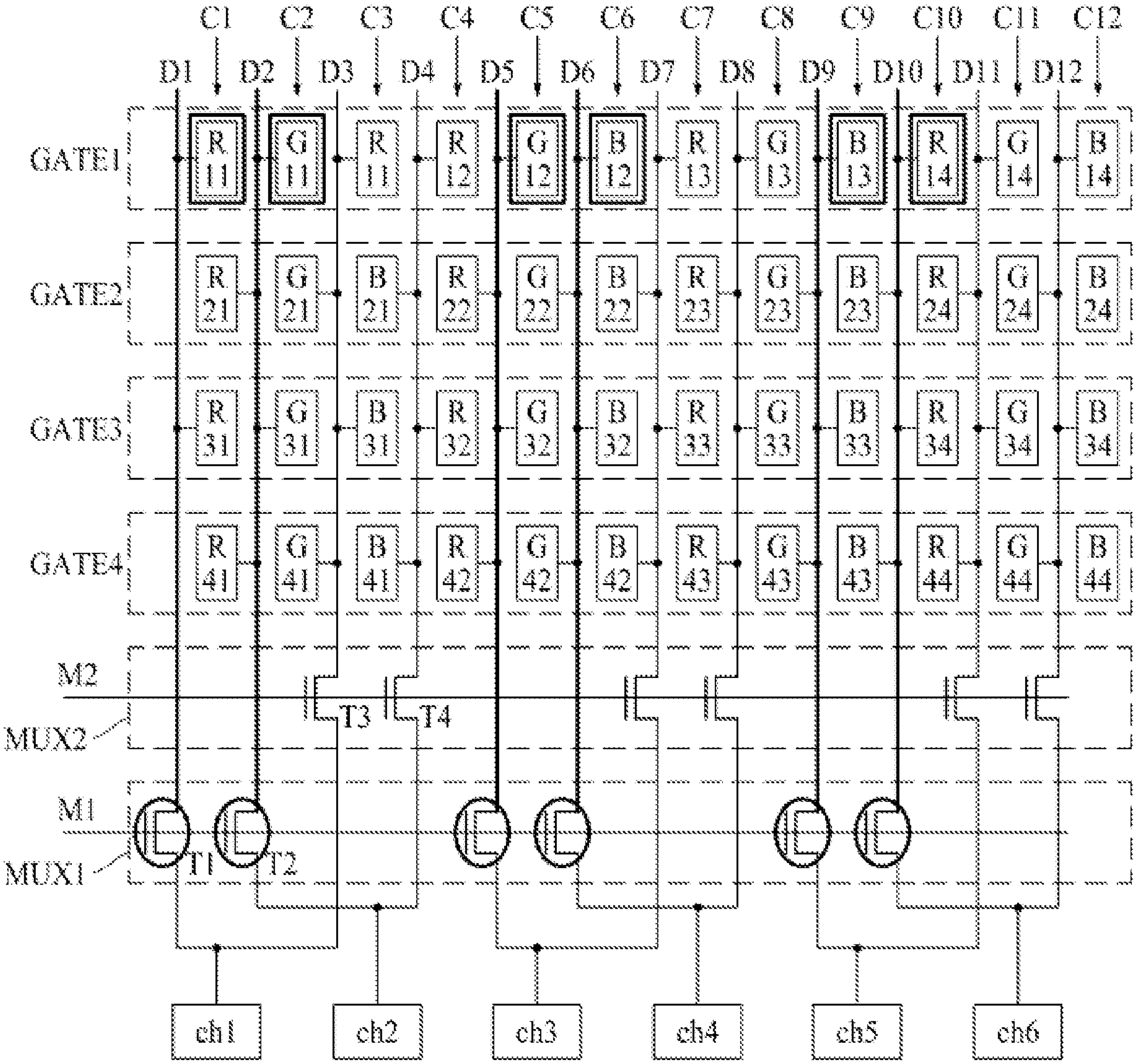
FIG. 5A is a view illustrating a first drive operation of the multiplexer unit and the pixel array according to one embodiment of the present disclosure.
Figure 5B:
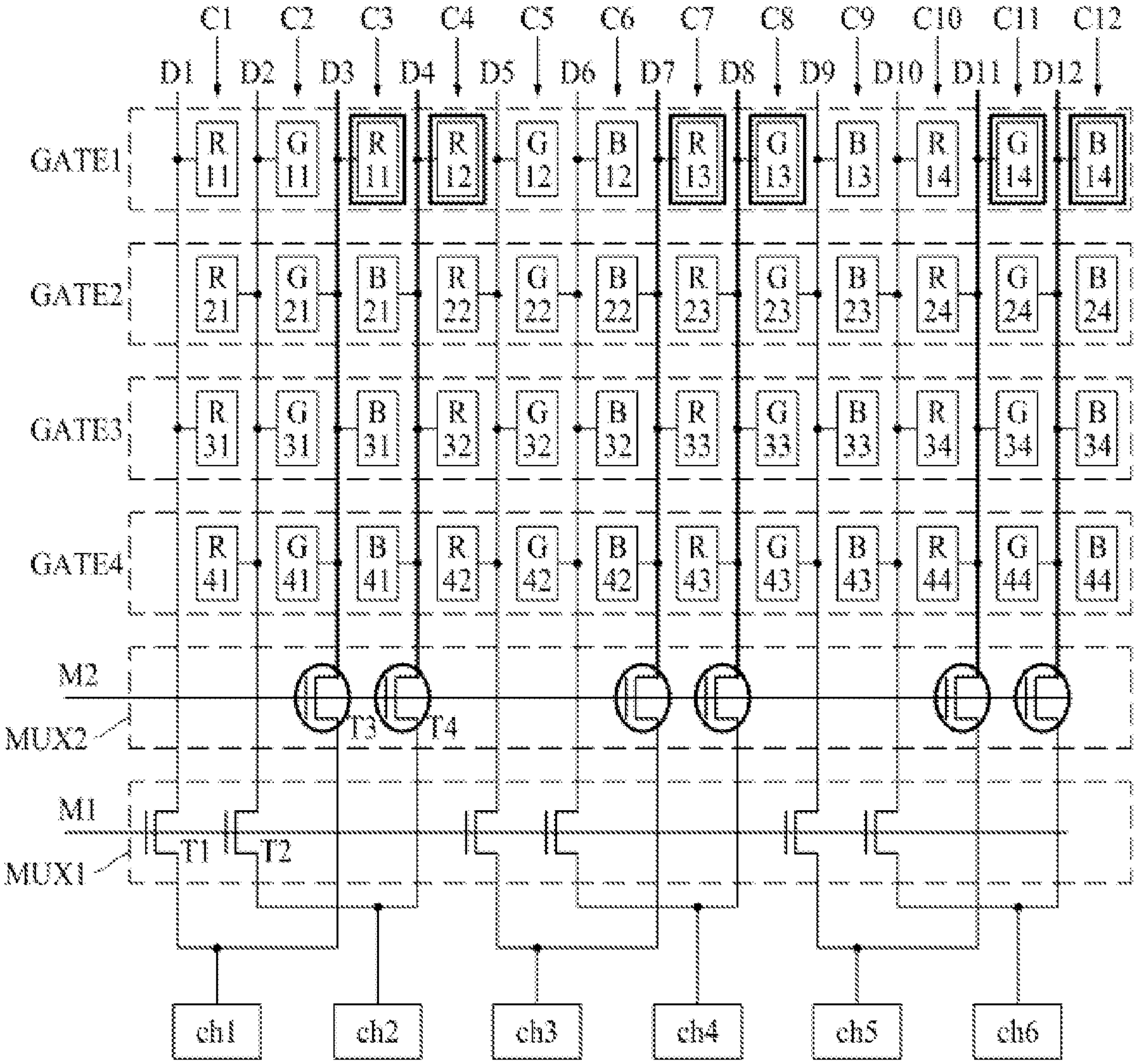
FIG. 5B is a view illustrating a second drive operation of the multiplexer unit and the pixel array according to one embodiment of the present disclosure.

In the first drive operation ST1 and the second drive operation ST2, the gate signal is input to the pixels located on the first horizontal line GATE1. That is, as illustrated in FIG. 4, in the first drive operation ST1, the first multiplexer MUX1 is turned on, and in the second drive operation ST2, the second multiplexer MUX2 is turned on. Accordingly, as illustrated in FIG. 5A, in the first drive operation ST1, the first and second switches T1 and T2 connected to the first multiplexer MUX1 are turned on, and thus, the pixels located on the first horizontal line GATE1 and connected to the first multiplexer MUX1 are turned on, and as illustrated in FIG. 5B, in the second drive operation ST2, the third and fourth switches T3 and T4 connected to the second multiplexer MUX2 are turned on, and thus, the pixels located on the first horizontal line GATE1 and connected to the second multiplexer MUX2 are turned on. For example, as illustrated in FIGS. 4, 5A, and 5B, in the first drive operation ST1, a pixel G12 located on the first horizontal line GATE1 and connected to the third source channel ch3 through the first multiplexer MUX1 is turned on, and in the second drive operation ST2, a pixel R13 located on the first horizontal line GATE1 and connected to the third source channel ch3 through the second multiplexer MUX2 is turned on.

Figure 5C:
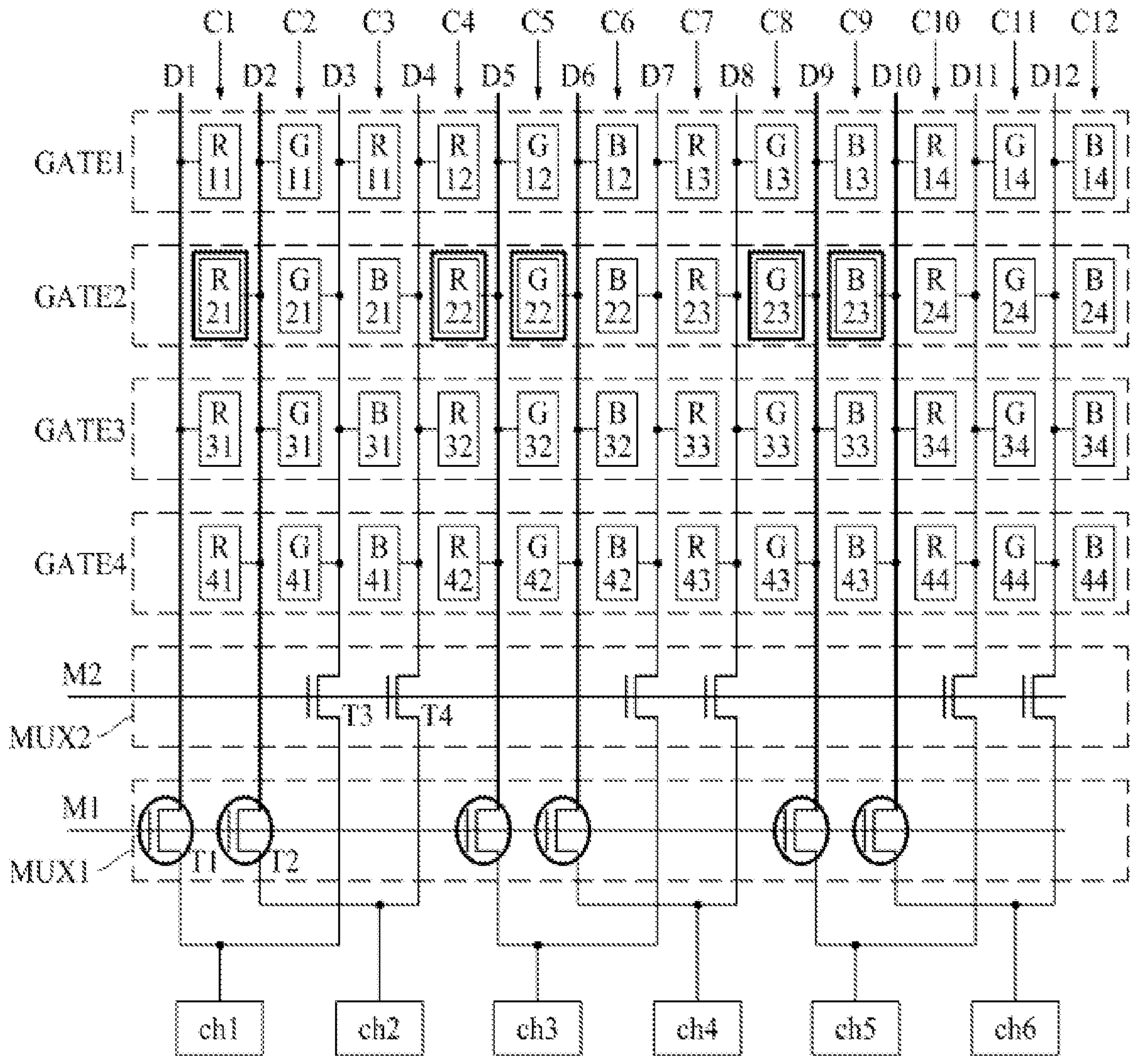
FIG. 5C is a view illustrating a third drive operation of the multiplexer unit and the pixel array according to one embodiment of the present disclosure.
Figure 5D:
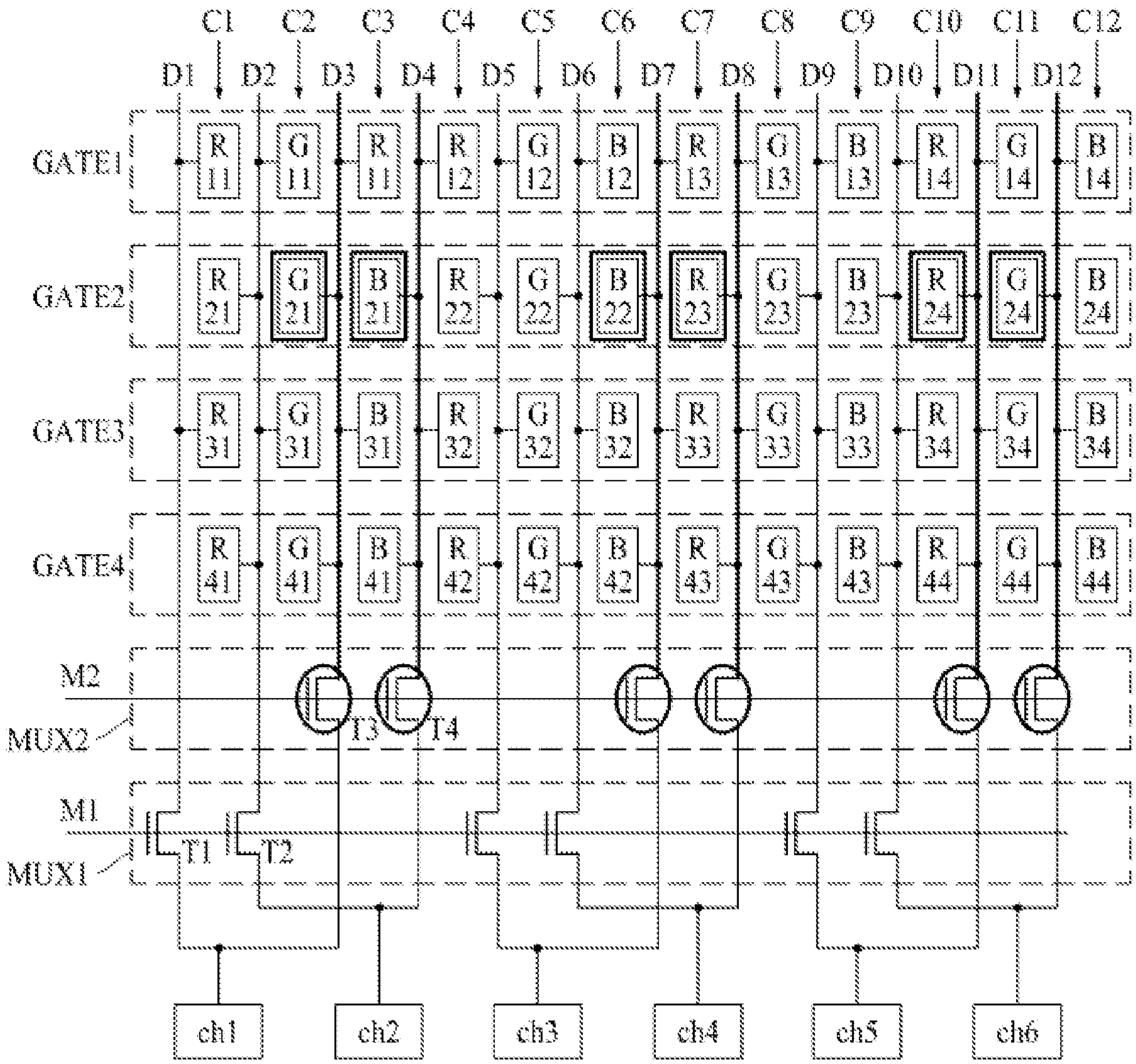
FIG. 5D is a view illustrating a fourth drive operation of the multiplexer unit and the pixel array according to one embodiment of the present disclosure.

Further, in the third drive operation ST3 and the fourth drive operation ST4, the gate signal is input to the pixels located on the second horizontal line GATE2. That is, as illustrated in FIG. 4, in the third drive operation ST3, the first multiplexer MUX1 is turned on, and in the second drive operation ST4, the second multiplexer MUX2 is turned on. Accordingly, as illustrated in FIG. 5C, in the third drive operation ST3, the first and second switches T1 and T2 connected to the first multiplexer MUX1 are turned on, and thus, the pixels located on the second horizontal line GATE2 and connected to the first multiplexer MUX1 are turned on, and as illustrated in FIG. 5D, in the fourth drive operation ST4, the third and fourth switches T3 and T4 connected to the second multiplexer MUX2 are turned on, and thus, the pixels located on the second horizontal line GATE2 and connected to the second multiplexer MUX2 are turned on. For example, as illustrated in FIGS. 4, 5C, and 5D, in the third drive operation ST3, a pixel R22 located on the second horizontal line GATE2 and connected to the third source channel ch3 through the first multiplexer MUX1 is turned on, and in the fourth drive operation ST4, a pixel B22 located on the second horizontal line GATE2 and connected to the third source channel ch3 through the second multiplexer MUX2 is turned on.

According to one embodiment of the present disclosure, as illustrated in FIG. 4, in the fifth to eighth drive operations ST5 to ST8, when the gate signal is input to the third horizontal line GATE3 and the fourth horizontal line GATE4, the first multiplexer MUX1 and the second multiplexer MUX2 are turned on in a reverse order.

Figure 5E:
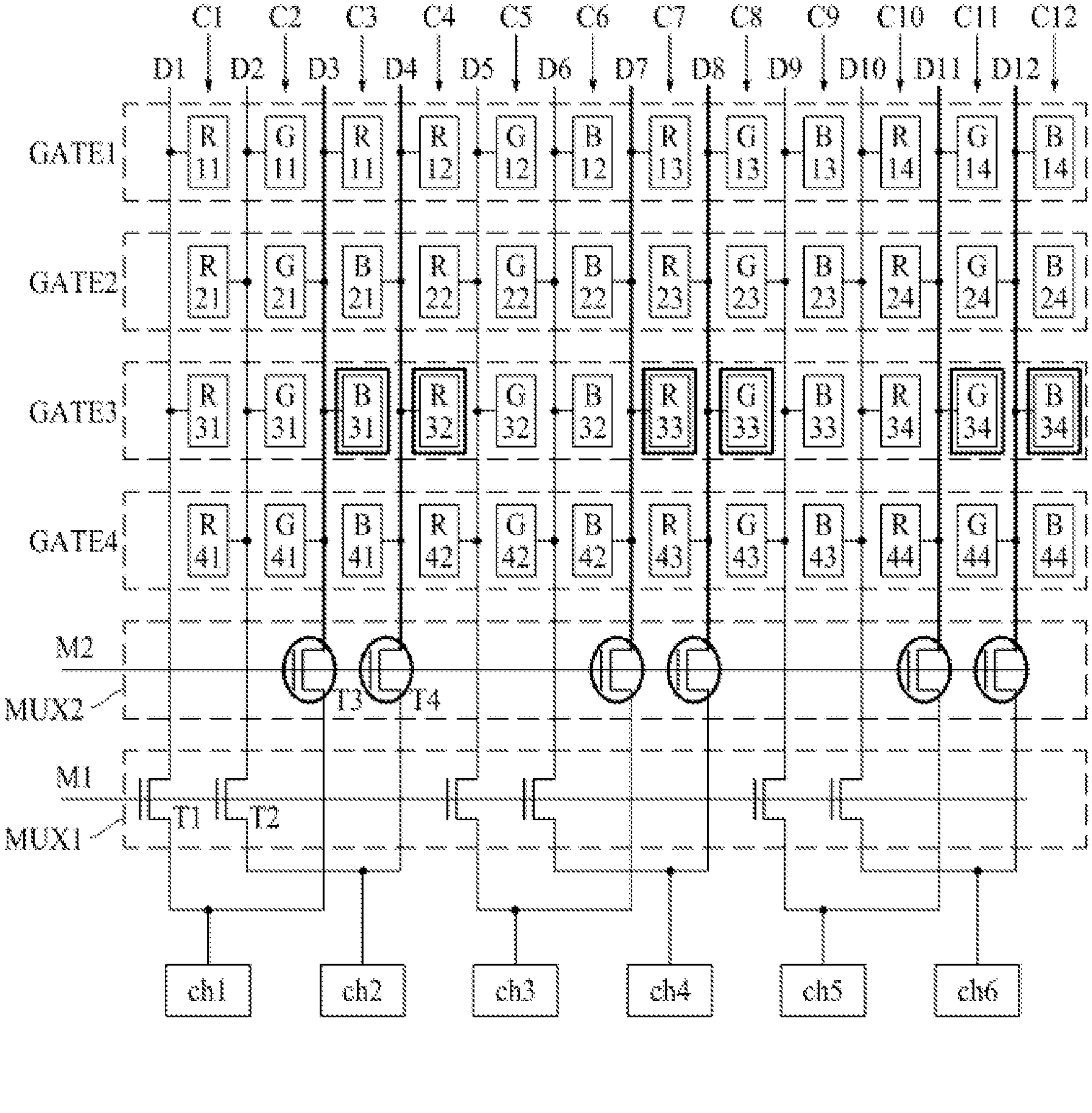
FIG. 5E is a view illustrating a fifth drive operation of the multiplexer unit and the pixel array according to one embodiment of the present disclosure.
Figure 5F:
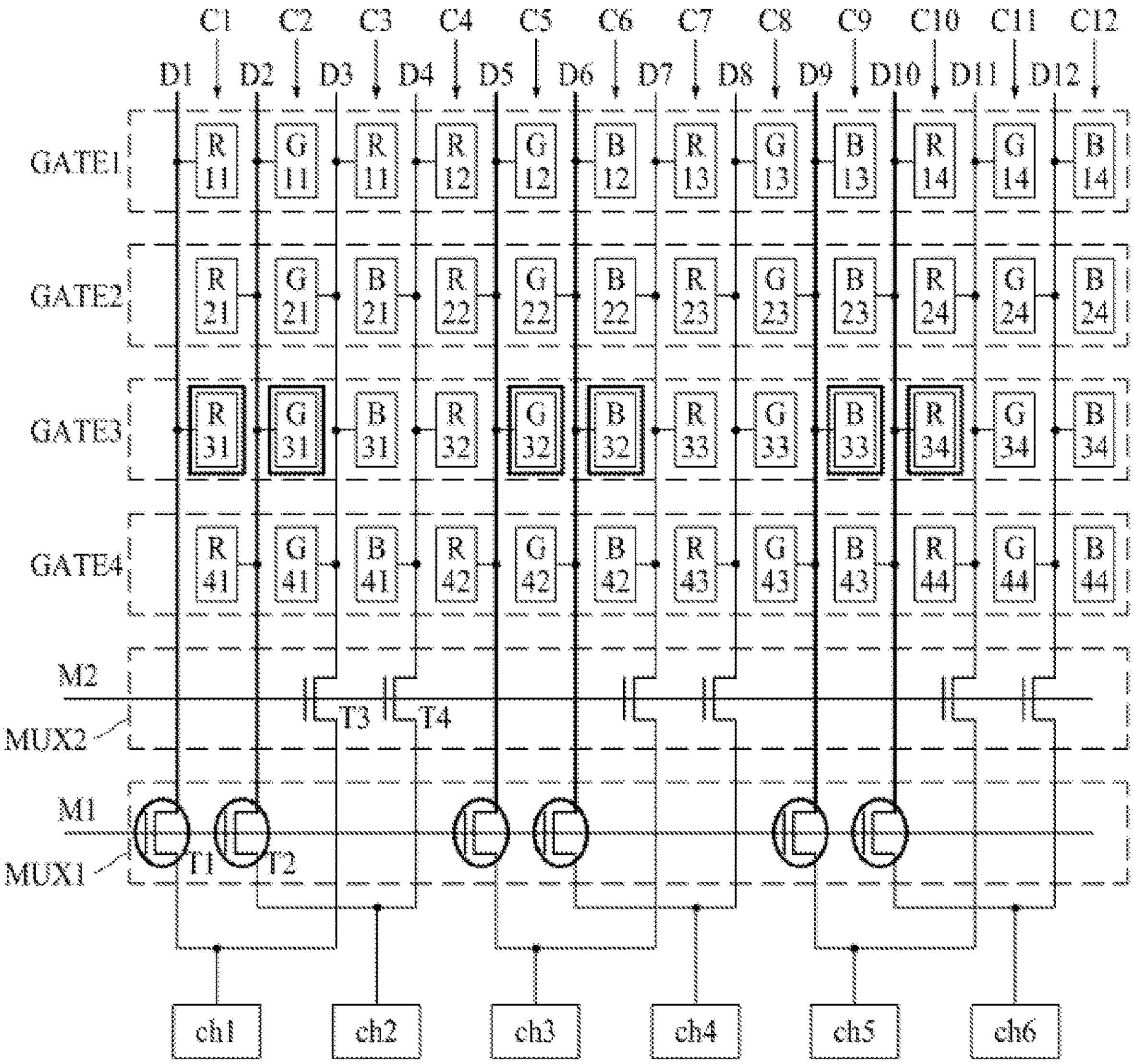
FIG. 5F is a view illustrating a sixth drive operation of the multiplexer unit and the pixel array according to one embodiment of the present disclosure.

In the fifth drive operation ST5 and the sixth drive operation ST6, the gate signal is input to the pixels located on the third horizontal line GATE3. That is, as illustrated in FIG. 4, in the fifth drive operation ST5, the second multiplexer MUX2 is turned on, and in the sixth drive operation ST6, the first multiplexer MUX1 is turned on. Accordingly, as illustrated in FIG. 5E, in the fifth drive operation ST5, the third and fourth switches T3 and T4 connected to the second multiplexer MUX2 are turned on, and thus, the pixels located on the third horizontal line GATE3 and connected to the second multiplexer MUX2 are turned on, and as illustrated in FIG. 5F, in the sixth drive operation ST6, the first and second switches T1 and T2 connected to the first multiplexer MUX1 are turned on, and thus, the pixels located on the third horizontal line GATE3 and connected to the first multiplexer MUX1 are turned on. For example, as illustrated in FIGS. 4, 5E, and 5F, in the fifth drive operation ST5, a pixel R33 located on the third horizontal line GATE3 and connected to the third source channel ch3 through the second multiplexer MUX2 is turned on, and in the sixth drive operation ST6, a pixel G32 located on the third horizontal line GATE3 and connected to the third source channel ch3 through the first multiplexer MUX1 is turned on.

Figure 5G:
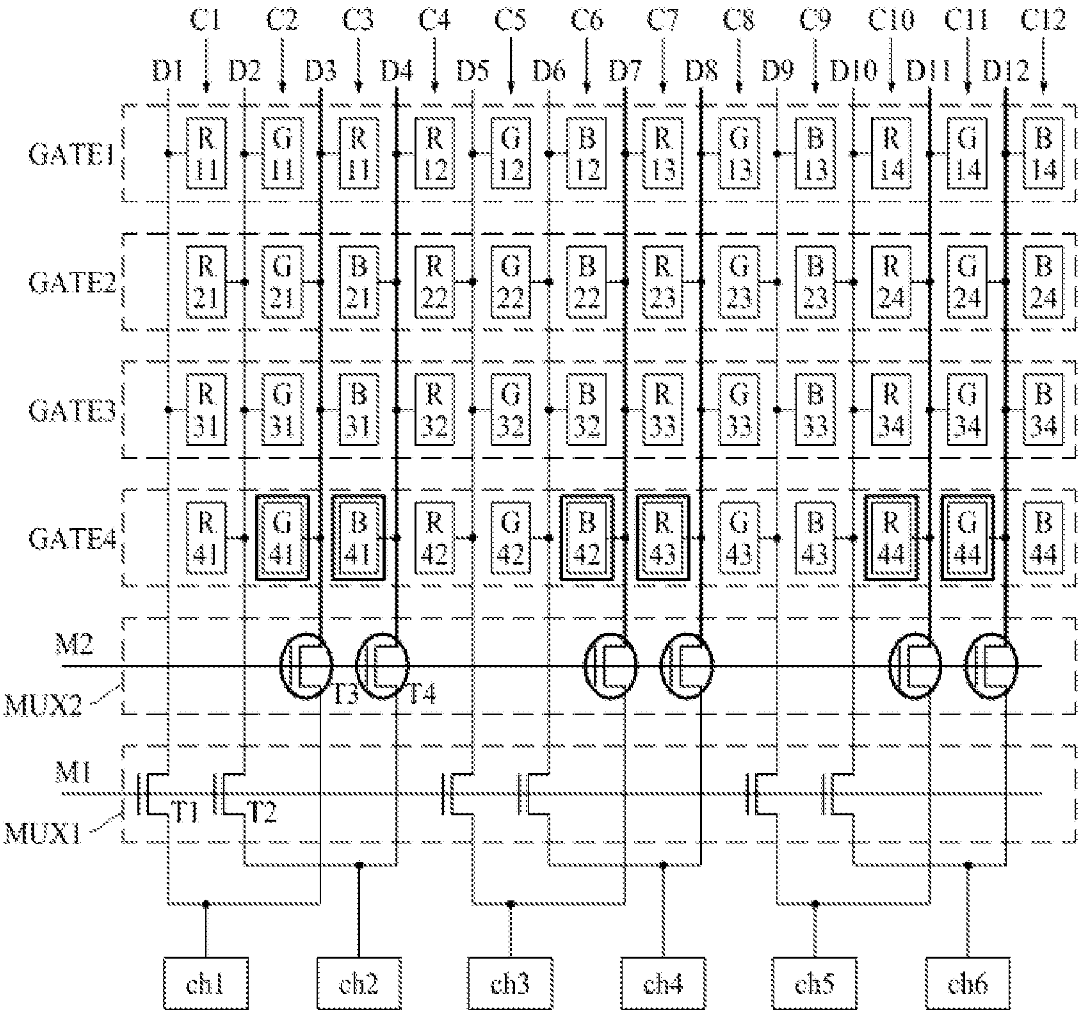
FIG. 5G is a view illustrating a seventh drive operation of the multiplexer unit and the pixel array according to one embodiment of the present disclosure.
Figure 5H:
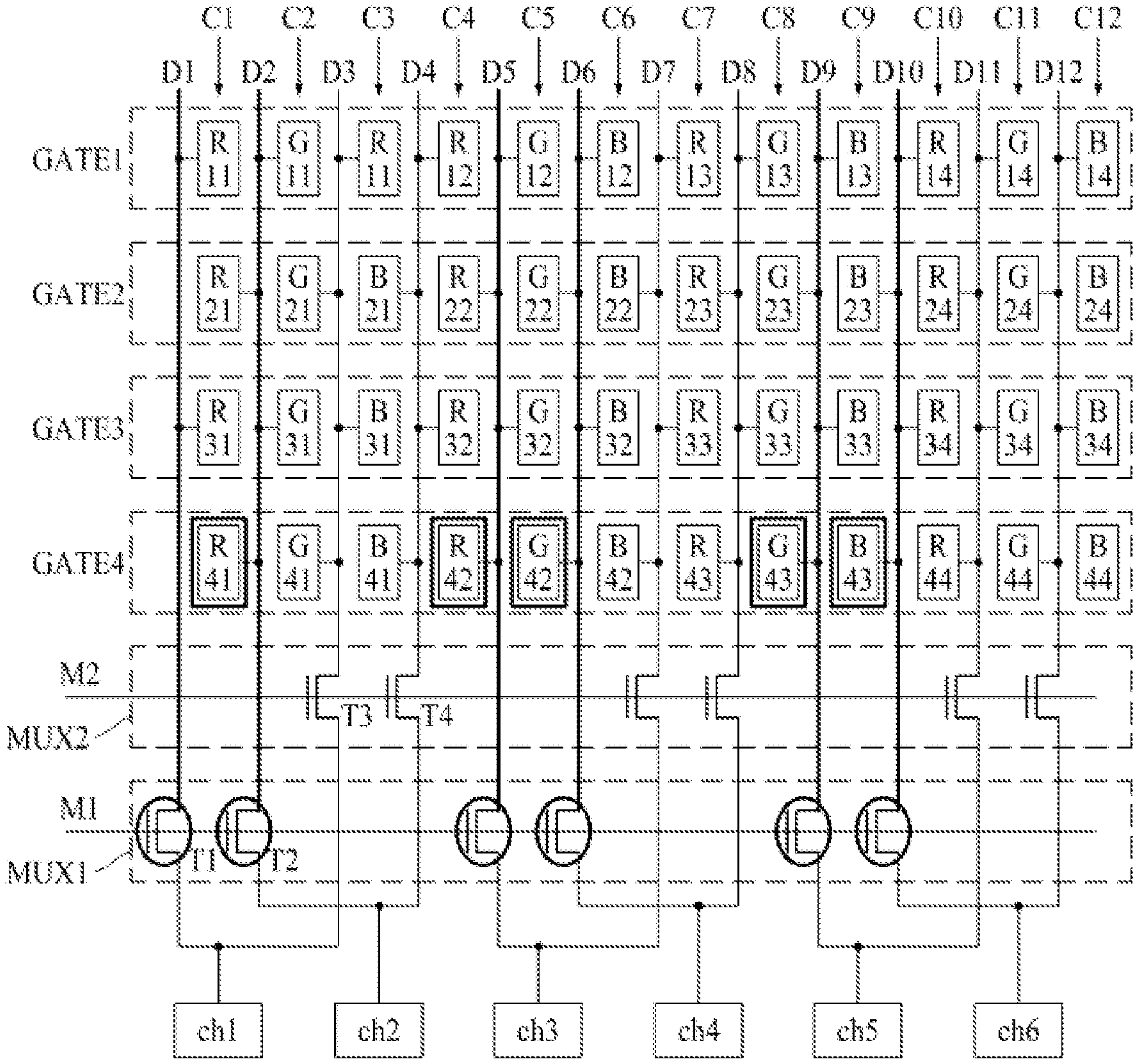
FIG. 5H is a view illustrating an eighth drive operation of the multiplexer unit and the pixel array according to one embodiment of the present disclosure.

Further, in the seventh drive operation ST7 and the eighth drive operation ST8, the gate signal is input to the pixels located on the fourth horizontal line GATE4. That is, as illustrated in FIG. 4, in the seventh drive operation ST7, the second multiplexer MUX2 is turned on, and in the eighth drive operation ST8, the first multiplexer MUX1 is turned on. Accordingly, as illustrated in FIG. 5G, in the seventh drive operation ST7, the third and fourth switches T3 and T4 connected to the second multiplexer MUX2 are turned on, and thus, the pixels located on the fourth horizontal line GATE4 and connected to the second multiplexer MUX2 are turned on, and as illustrated in FIG. 5H, in the eighth drive operation ST8, the first and second switches T1 and T2 connected to the first multiplexer MUX1 are turned on, and thus, the pixels located on the fourth horizontal line GATE4 and connected to the first multiplexer MUX1 are turned on. For example, as illustrated in FIGS. 4, 5G, and 5H, in the seventh drive operation ST7, a pixel B42 located on the fourth horizontal line GATE4 and connected to the third source channel ch3 through the second multiplexer MUX2 is turned on, and in the eighth drive operation ST8, a pixel R42 located on the fourth horizontal line GATE4 and connected to the third source channel ch3 through the first multiplexer MUX1 is turned on.

According to one embodiment of the present disclosure, while the gate signal is input to the first to fourth horizontal lines GATE1 to GATE4, the multiplexer unit MUX is driven in the first to eighth drive operations ST1 to ST8. In detail, the first multiplexer MUX1 and the second multiplexer MUX2 are driven sequentially in the first to fourth drive operation ST1 to ST4 and are driven in the fifth to eighth drive operation ST5 to ST8 in a reverse order. Accordingly, since the pixels located on one vertical line are not displayed in the same order, display defects due to vertical line recognition can be prevented.

A display device and a method of driving the same according to the present disclosure can uniformly display an image by changing an operation order of multiplexers.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A display device comprising:

a data drive unit configured to convert image data into a data signal and output the data signal and including first to fourth channels;

a multiplexer unit configured to time-divide the data signal output from the data drive unit and output the time-divided data signals to first to eighth data lines; and a gate drive unit configured to output a gate signal synchronized with the data signal to a first gate line, a second gate line, a third gate line, and a fourth gate line, wherein the gate signal is sequentially input to the first gate line, second gate line, the third gate line and fourth gate line, wherein the multiplexer unit includes a first multiplexer and a second multiplexer corresponding to the first to fourth channels, wherein when the gate signal is input to the first gate line, the first multiplexer and the second multiplexer are turned on in a first sequential order to output the data signal from the first channel to the first and third data lines, wherein when the gate signal is input to the second gate line after the gate signal is input to the first gate line, the first multiplexer and the second multiplexer are turned on in the first sequential order to output the data signal from the second channel to the second and fourth data lines, wherein when the gate signal is input to the third gate line after the gate signal is input to the second gate line, the first multiplexer and the second multiplexer are turned on in a second sequential order to output the data signal from the third channel to the fifth and seventh data lines, wherein the second sequential order is an opposite operation order to the first sequential order, and wherein when the gate signal is input to the fourth gate line after the gate signal is input to the third gate line, the first multiplexer and the second multiplexer are turned on in the second sequential order to output the data signal from the fourth channel to the sixth and eighth data lines.

2. The display device of claim 1, wherein the gate drive unit outputs the gate signal to the first gate line to the fourth gate line, when the gate signal is input to the first gate line during one horizontal period, the first multiplexer is turned on during a first half of the horizontal period and the second multiplexer is turned on during a second half of the horizontal period, when the gate signal is input to the second gate line during one horizontal period, the first multiplexer is turned on during a first half of the horizontal period and the second multiplexer is turned on during a second half of the horizontal period, when the gate signal is input to the third gate line during one horizontal period, the second multiplexer is turned on during a first half of the horizontal period and the first multiplexer is turned on during a second half of the horizontal period, and when the gate signal is input to the fourth gate line during one horizontal period, the second multiplexer is turned on during a first half of the horizontal period and the first multiplexer is turned on during a second half of the horizontal period.

3. The display device of claim 1, wherein the data drive unit outputs the data signal to a first data line, a second data line, a third data line and a fourth data line, when the gate signal is input to the first gate line, the data drive unit outputs sequentially the data signal to the first data line and the second data line through the first multiplexer and to the third data line and the fourth data line through the second multiplexer, when the gate signal is input to the second gate line, the data drive unit outputs sequentially the data signal to the first data line and the second data line through the first multiplexer and to the third data line and the fourth data line through the second multiplexer, when the gate signal is input to the third gate line, the data drive unit outputs sequentially the data signal to the third data line and the fourth data line through the second multiplexer and to the first data line and the second data line through the first multiplexer, and when the gate signal is input to the fourth gate line, the data drive unit outputs sequentially the data signal to the third data line and the fourth data line through the second multiplexer and to the first data line and the second data line through the first multiplexer.

4. The display device of claim 1, wherein the data drive unit outputs the data signal to a first data line, a second data line, a third data line and a fourth data line, the first multiplexer includes a first switch and a second switch, the second multiplexer includes a third switch and a fourth switch, and the data drive unit includes:

a first source channel configured to output the data signal to the first data line through the first switch and output the data signal to the third data line through the third switch; and a second source channel configured to output the data signal to the second data line through the second switch and output the data signal to the fourth data line through the fourth switch.

5. The display device of claim 4, wherein the first switch and the third switch are alternately turned on, and the second switch and the fourth switch are alternately turned on.

6. The display device of claim 1, further comprising a display panel including pixels arranged in a matrix form by intersecting a first data line, a second data line, a third data line and a fourth data line and the first gate line to the fourth gate line, wherein a pixel disposed between the first data line and the second data line is a pixel of a first color, a pixel disposed between the second data line and the third data line is a pixel of a second color, a pixel disposed between the third data line and the fourth data line is a pixel of a third color, the first color is red, the second color is green, and the third color is blue.

7. The display device of claim 1, further comprising a display panel including pixels arranged in a matrix form by intersecting a first data line, a second data line, a third data line and a fourth data line and the first gate line to the fourth gate line, wherein pixels located on odd-numbered horizontal lines are connected to data lines arranged on a left side of corresponding pixels, and pixels located on even-numbered horizontal lines are connected to data lines arranged on a right side of the corresponding pixels.

8. The display device of claim 1, further comprising a display panel including pixels arranged in a matrix form by a first data line, a second data line, a third data line and a fourth data line and the first gate line to the fourth gate line, wherein, when the gate signal is input to the first gate line, pixels connected to the first data line and the second data line and pixels connected to the third data line and the fourth data line among pixels connected to the first gate line are sequentially turned on, when the gate signal is input to the second gate line, pixels connected to the first data line and the second data line and pixels connected to the third data line and the fourth data line among pixels connected to the second gate line are sequentially turned on, when the gate signal is input to the third gate line, pixels connected to the third data line and the fourth data line and pixels connected to the first data line and the second data line among pixels connected to the third gate line are sequentially turned on, and when the gate signal is input to the fourth gate line, pixels connected to the third data line and the fourth data line and pixels connected to the first data line and the second data line among pixels connected to the fourth gate line are sequentially turned on.

9. A method of driving a display device, the method comprising:

turning on a first multiplexer and a second multiplexer in a first sequential order to output a data signal from a first channel of a data drive unit to first and third data lines, when a gate signal is input to a first gate line;

turning on the first multiplexer and the second multiplexer in the first sequential order to output the data signal from a second channel of the data drive unit to second and fourth data lines, when the gate signal is input to a second gate line after the gate signal is input to the first gate line;

turning on the first multiplexer and the second multiplexer in a second sequential order to output the data signal from a third channel of the data drive unit to fifth and seventh data lines when the gate signal is input to a third gate line after the gate signal is input to the second gate line, wherein the second sequential order is an opposite operation order to the first sequential order; and turning on the first multiplexer and the second multiplexer in the second sequential order to output the data signal from a fourth channel of the data drive unit to sixth and eighth data lines, when the gate signal is input to a fourth gate line after the gate signal is input to the third gate line, wherein the gate signal is sequentially input to the first gate line, the second gate line, the third gate line and the fourth gate line.

10. The method of claim 9, wherein the sequential turning on of the first multiplexer and the second multiplexer by inputting the gate signal to the first gate line includes:

outputting a data signal to a first data line and a second data line through the first multiplexer during a period during which the gate signal is input to the first gate line; and outputting the data signal to a third data line and a fourth data line through the second multiplexer during a period during which the gate signal is input to the first gate line, the sequential turning on of the first multiplexer and the second multiplexer by inputting the gate signal to the second gate line includes:

outputting the data signal to the first data line and the second data line through the first multiplexer during a period during which the gate signal is input to the second gate line; and outputting the data signal to the third data line and the fourth data line through the second multiplexer during the period during which the gate signal is input to the second gate line, the sequential turning on of the second multiplexer and the first multiplexer by inputting the gate signal to the third gate line includes:

outputting the data signal to the third data line and the fourth data line through the second multiplexer during a period during which the gate signal is input to the third gate line; and outputting the data signal to the first data line and the second data line through the first multiplexer during the period during which the gate signal is input to the third gate line, and the sequential turning on of the second multiplexer and the first multiplexer by inputting the gate signal to the fourth gate line includes:

outputting the data signal to the third data line and the fourth data line through the second multiplexer during a period during which the gate signal is input to the fourth gate line; and outputting the data signal to the first data line and the second data line through the first multiplexer during the period during which the gate signal is input to the fourth gate line.

11. The method of claim 9, wherein a first data line and a third data line receive a data signal from a first source channel through the first multiplexer, and a second data line and a fourth data line receive the data signal from a second source channel through the second multiplexer.

12. The method of claim 9, wherein the first multiplexer includes a first switch configured to transmit a data signal to a first data line and a second switch configured to transmit the data signal to a second data line, and the second multiplexer includes a third switch configured to transmit the data signal to a third data line and a fourth switch configured to transmit the data signal to a fourth data line.

13. The method of claim 9, wherein the sequential turning on of the first multiplexer and the second multiplexer by inputting the gate signal to the first gate line includes turning on the first multiplexer during a first half of a horizontal period and turning on the second multiplexer during a second half of the horizontal period, the sequential turning on of the first multiplexer and the second multiplexer by inputting the gate signal to the second gate line includes turning on the first multiplexer during the first half of the horizontal period and turning on the second multiplexer is during the second half of the horizontal period, the sequential turning on of the first multiplexer and the second multiplexer by inputting the gate signal to the third gate line includes turning on the second multiplexer during the first half of the horizontal period and turning on the first multiplexer during the second half of the horizontal period, and the sequential turning on of the first multiplexer and the second multiplexer by inputting the gate signal to the fourth gate line includes turning on the second multiplexer during the first half of the horizontal period and turning on the first multiplexer during the second half of the horizontal period.

* * * * *